United States Patent [19]

Harman et al.

[11] Patent Number: 5,752,312
[45] Date of Patent: May 19, 1998

[54] TUBE TRANSFER DEVICE

[75] Inventors: Galen B. Harman, La Grange, Ind.; Derrick S. Small, Sturgis, Mich.

[73] Assignee: Burr Oak Tool & Gauge Company, Inc., Sturgis, Mich.

[21] Appl. No.: 723,017

[22] Filed: Sep. 30, 1996

Related U.S. Application Data

[62] Division of Ser. No. 280,877, Jul. 26, 1994, Pat. No. 5,632,080.

[51] Int. Cl.$^6$ ................................................. B23P 15/26
[52] U.S. Cl. .................... 29/726.5; 29/33 G; 29/72 G; 29/33 T; 414/222; 198/468.6
[58] Field of Search ....................... 29/726, 726.5, 29/728, 33 G, 33 T; 414/222, 749, 745.3; 198/468.6, 468.01, 468.3, 463.3

[56] References Cited

U.S. PATENT DOCUMENTS

| | | |
|---|---|---|
| 362,103 | 5/1887 | Nason . |
| 1,802,929 | 4/1931 | Seel . |
| 2,133,932 | 10/1938 | Whistler et al. . |
| 2,154,855 | 4/1939 | Lear ........................... 29/84 |
| 3,048,280 | 8/1962 | Huff et al. ................. 29/726.5 |
| 3,272,021 | 9/1966 | Weber ........................ 74/25 |
| 3,406,838 | 10/1968 | Davidson .................. 29/726 |
| 3,581,470 | 6/1971 | Aikenhead et al. ....... 29/726 |
| 3,733,673 | 5/1973 | Young et al. ............. 29/726 |
| 3,987,889 | 10/1976 | Godoy ...................... 198/456 |
| 4,195,540 | 4/1980 | Franks ....................... 83/95 |
| 4,543,711 | 10/1985 | Wada et al. ............... 29/726 |
| 4,584,751 | 4/1986 | Gray et al. ................ 29/157.3 |
| 4,637,132 | 1/1987 | Iwase et al. .............. 29/726 |
| 4,652,200 | 3/1987 | Johnson .................... 29/726 |
| 5,003,691 | 4/1991 | Milliman et al. ......... 29/727 |
| 5,022,813 | 6/1991 | Smith et al. .............. 198/463.3 |
| 5,233,853 | 8/1993 | Milliman ................... 72/24 |
| 5,432,994 | 7/1995 | Tokura ....................... 29/727 |

*Primary Examiner*—Larry I. Schwartz
*Assistant Examiner*—Marc W. Butler
*Attorney, Agent, or Firm*—Flynn, Thiel, Boutell & Tanis, P.C.

[57] ABSTRACT

A tube transfer device which includes a tube conveyor for transporting processed tubes from an entry location to an exit location thereon. The tube conveyor includes a plurality of first tube holders thereon which are adapted to hold the processed tubes so that axes thereof will extend parallel to one another and be laterally spaced apart a first distance from one another at the aforesaid entry location. A movable tube shuttle is provided for shifting processed tubes between a first position and a second position located adjacent the aforesaid entry location to the tube conveyor. The tube shuttle includes movable second tube holders adapted to receive the processed tubes when at the aforesaid first position and while maintaining a second distance between the processed tubes. The tube shuttle also includes structure for varying the lateral spacing between the processed tubes on the second tube holders from the second distance to the first distance and in response to a movement of the tube shuttle between the first position and the second position so that the processed tubes will be spaced at the first distance from one another when the tube shuttle is at the entry location to the tube conveyor. A device for transferring the tubes on the tube shuttle to the tube conveyor is provided.

5 Claims, 17 Drawing Sheets

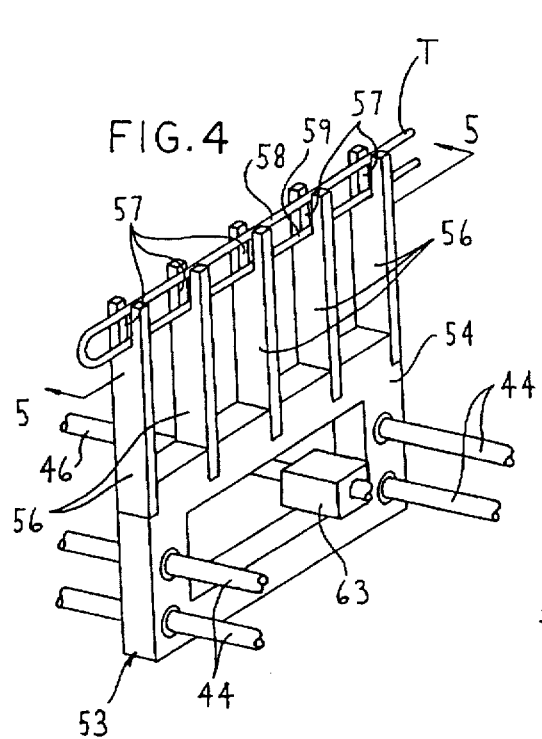
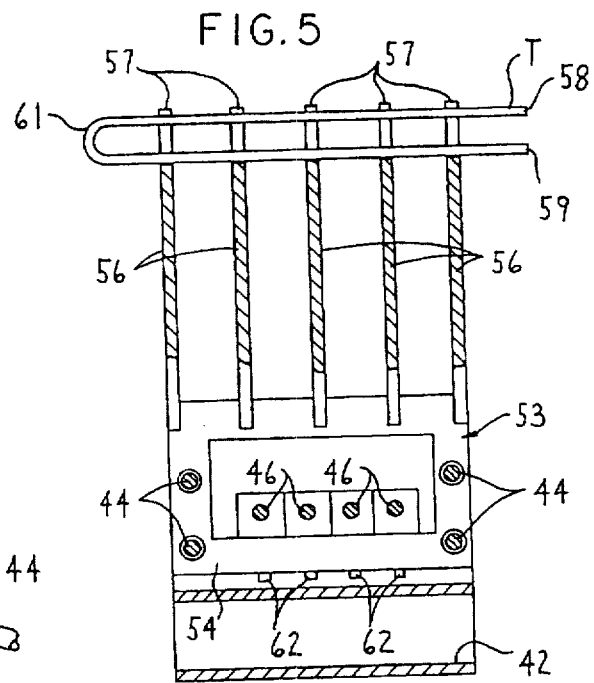
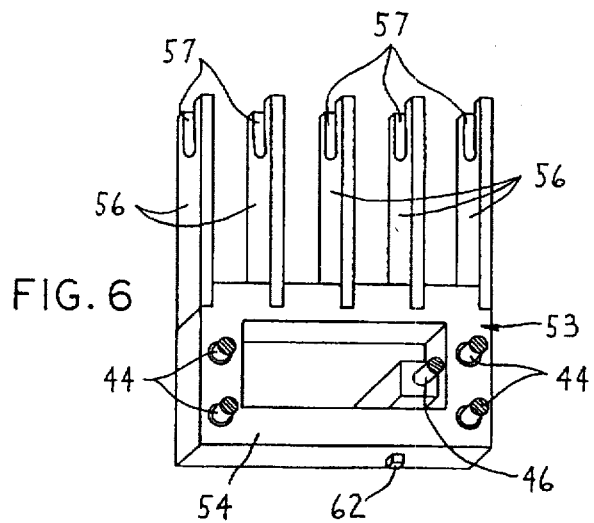

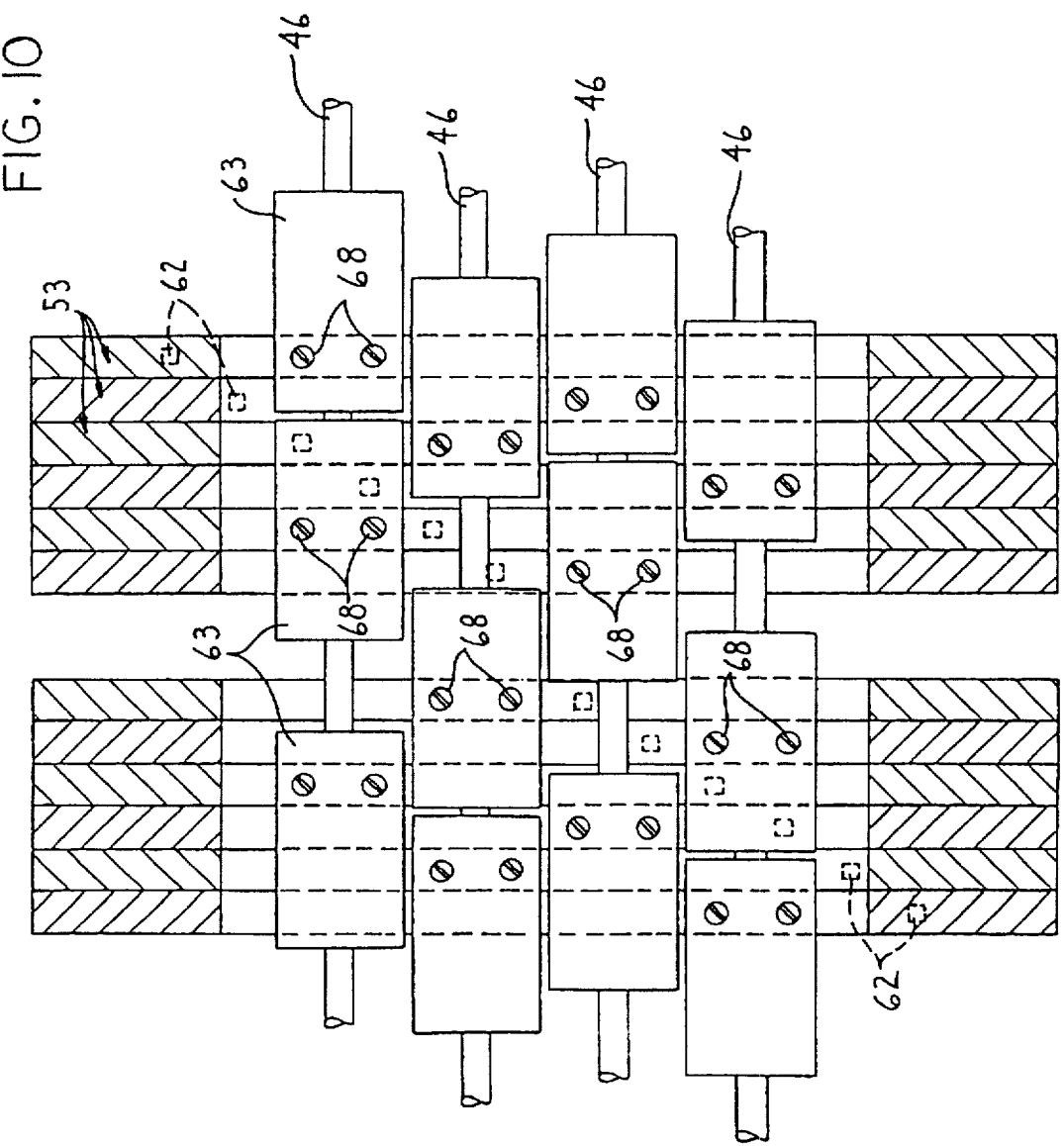

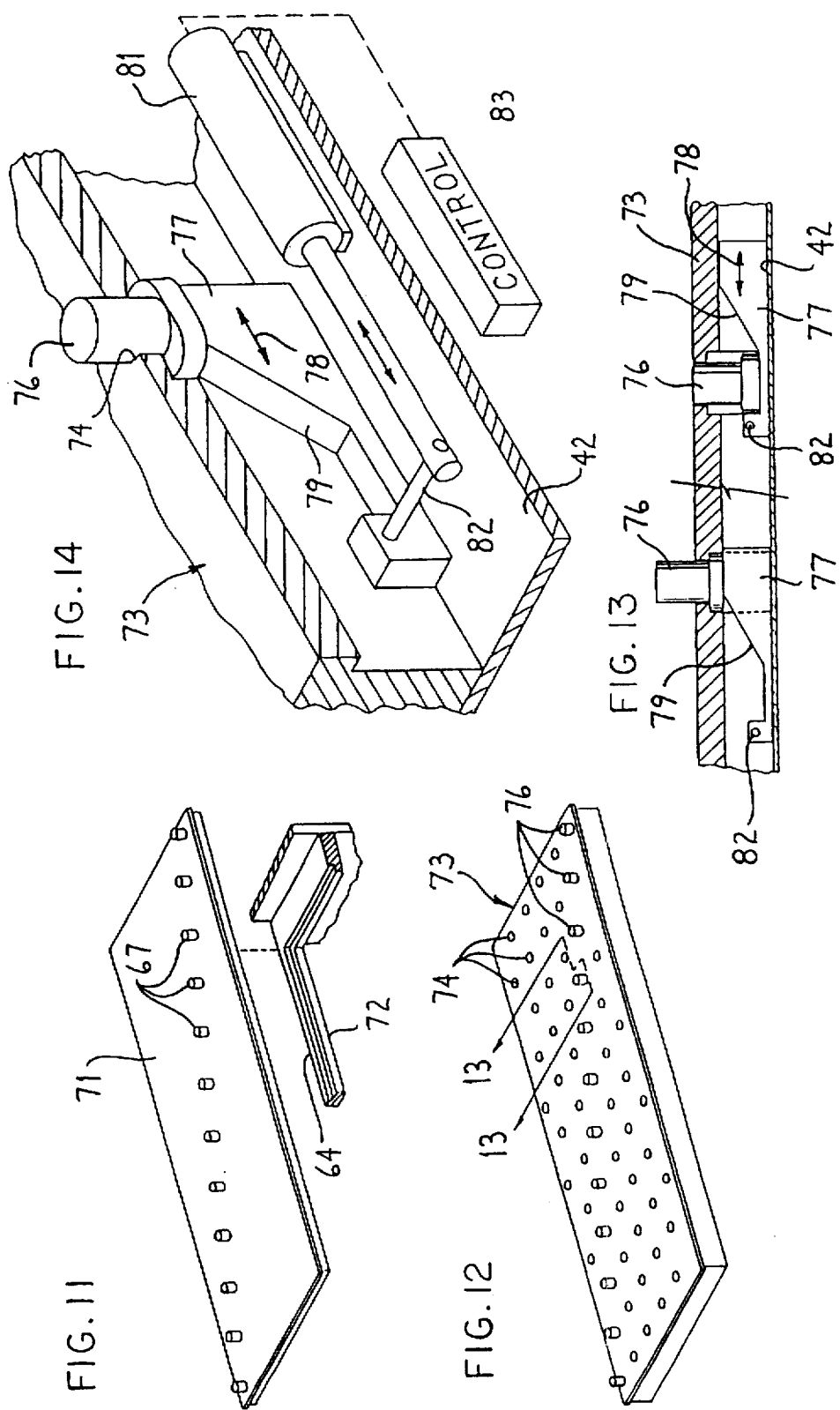

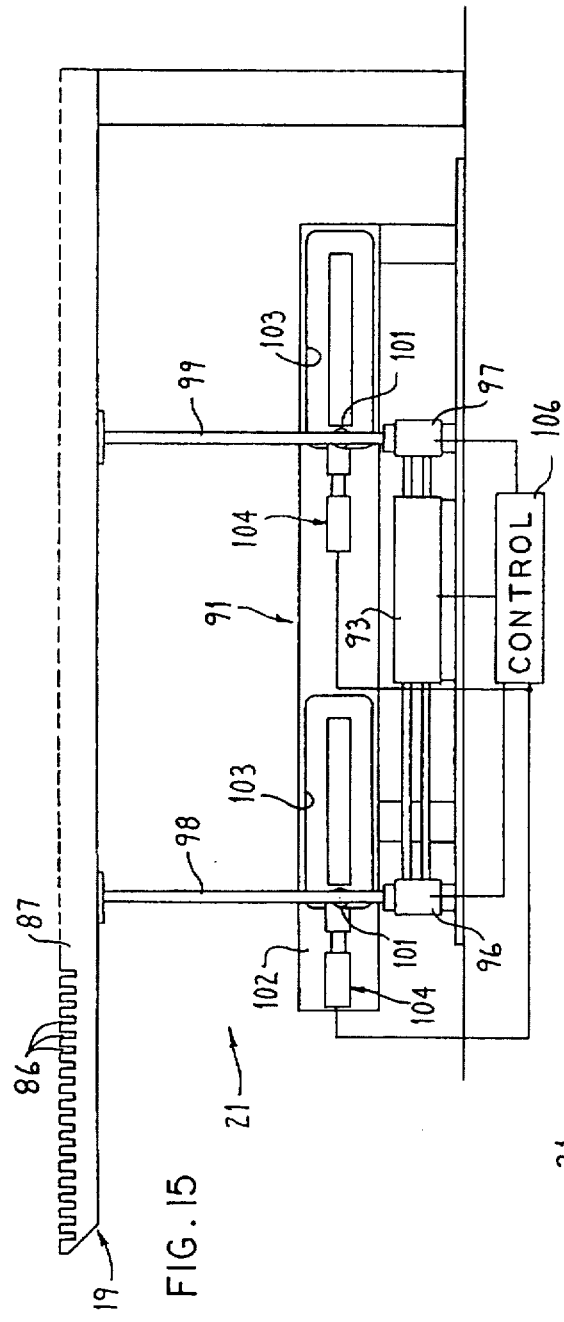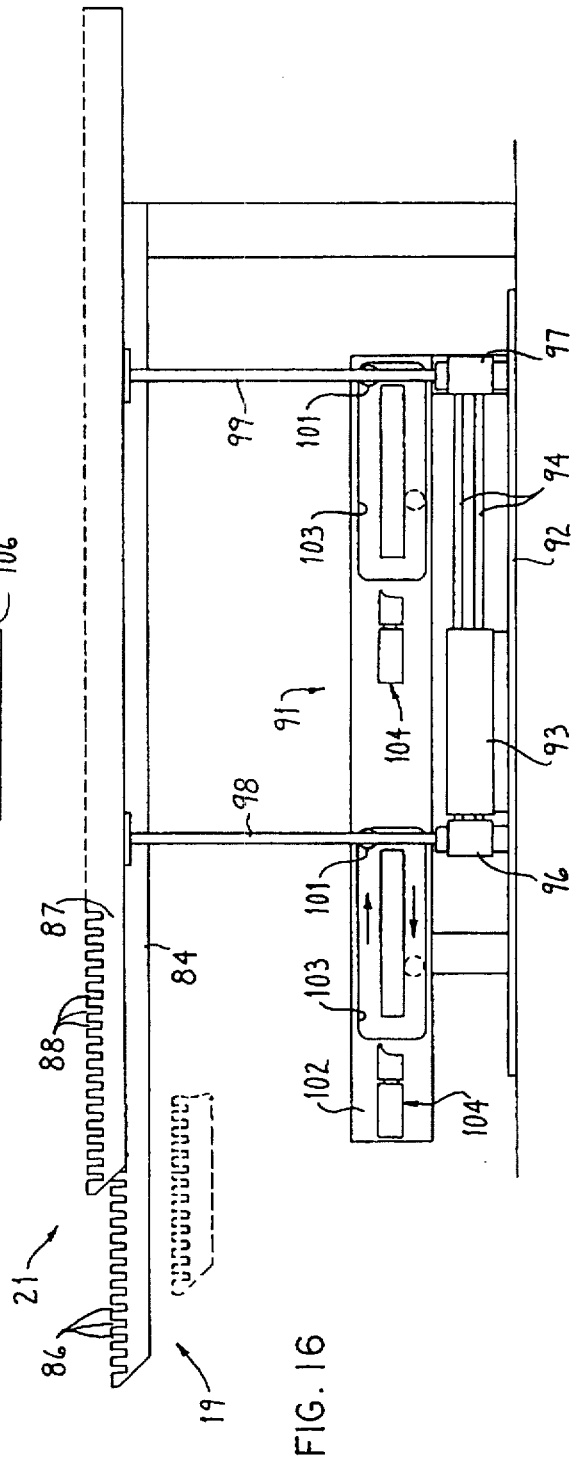

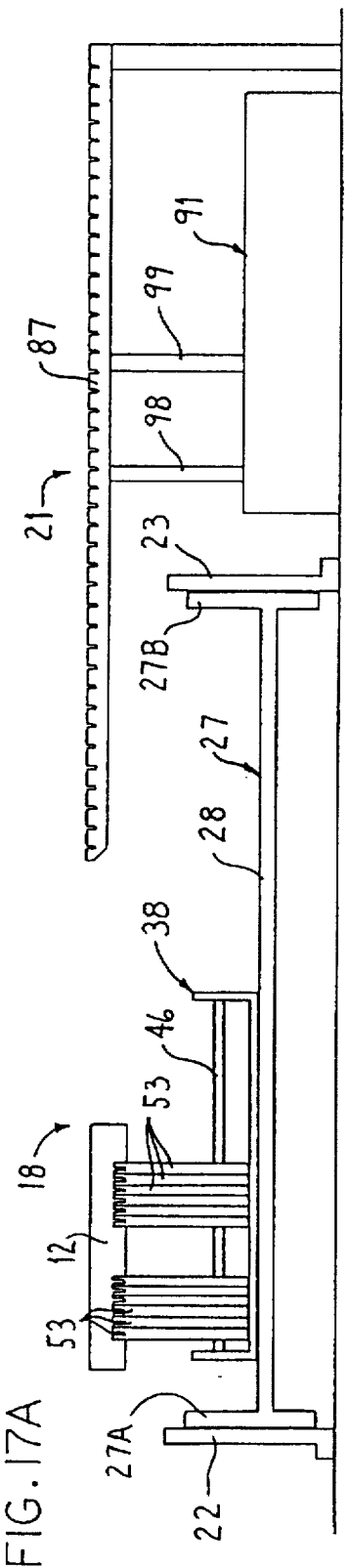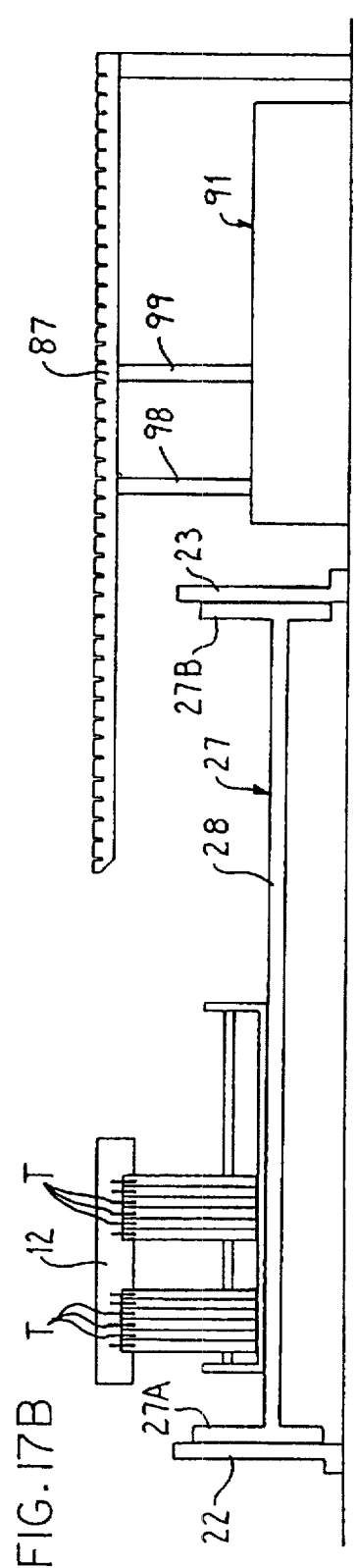

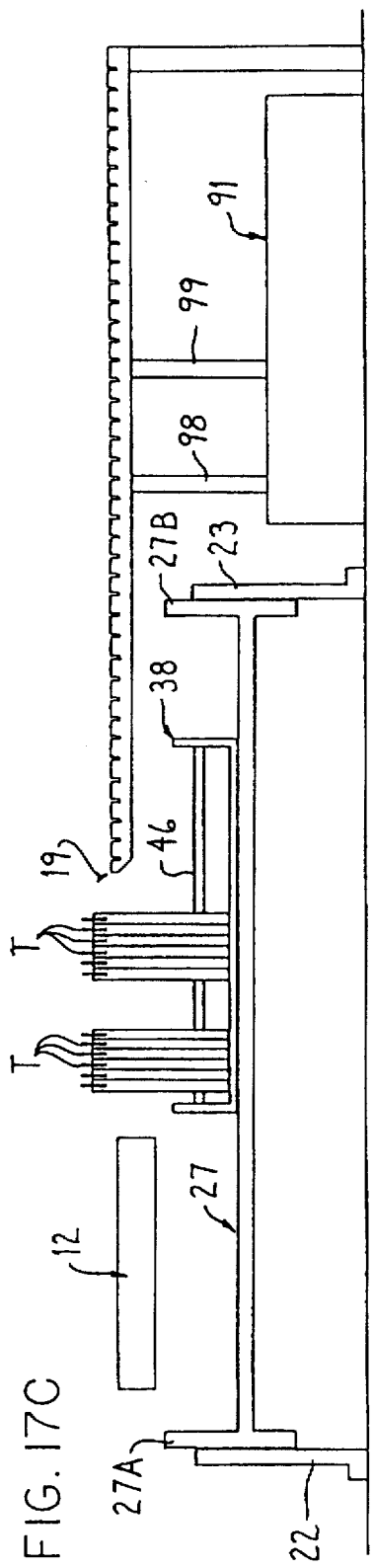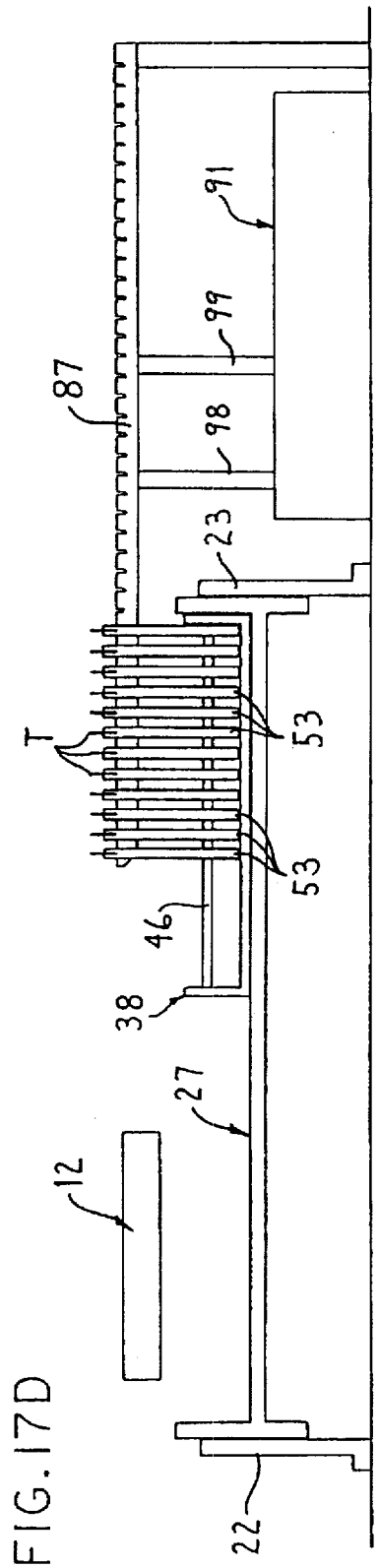
FIG. 17C
FIG. 17D

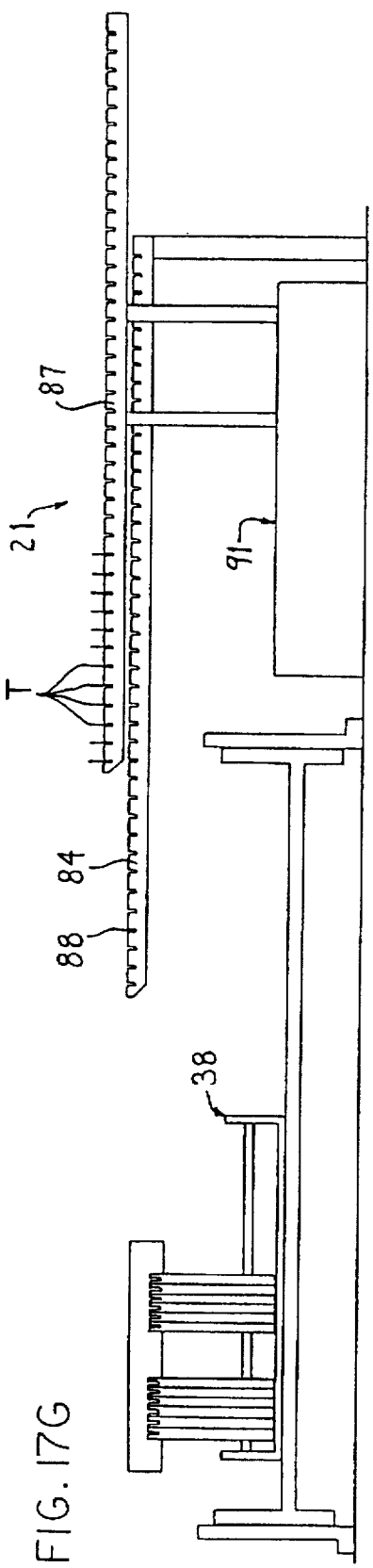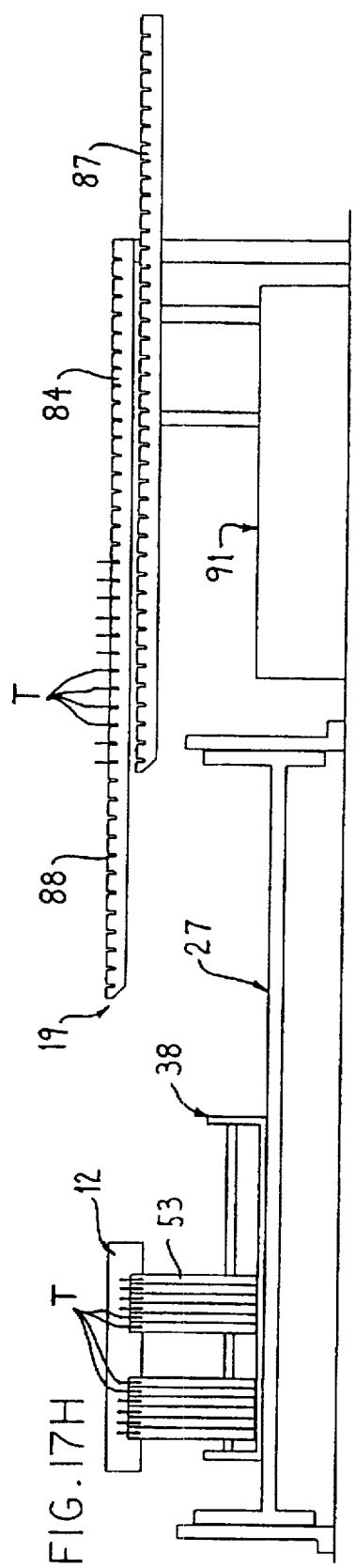

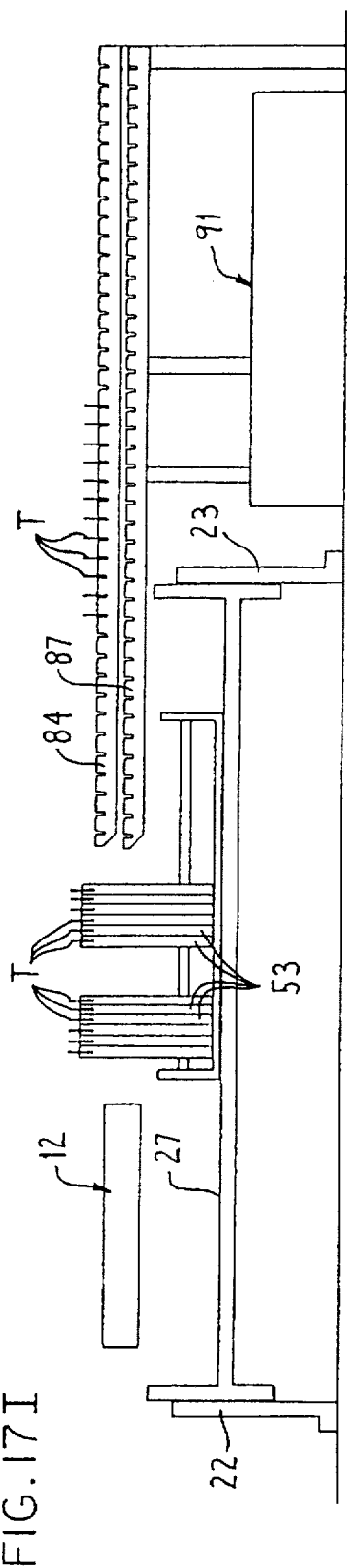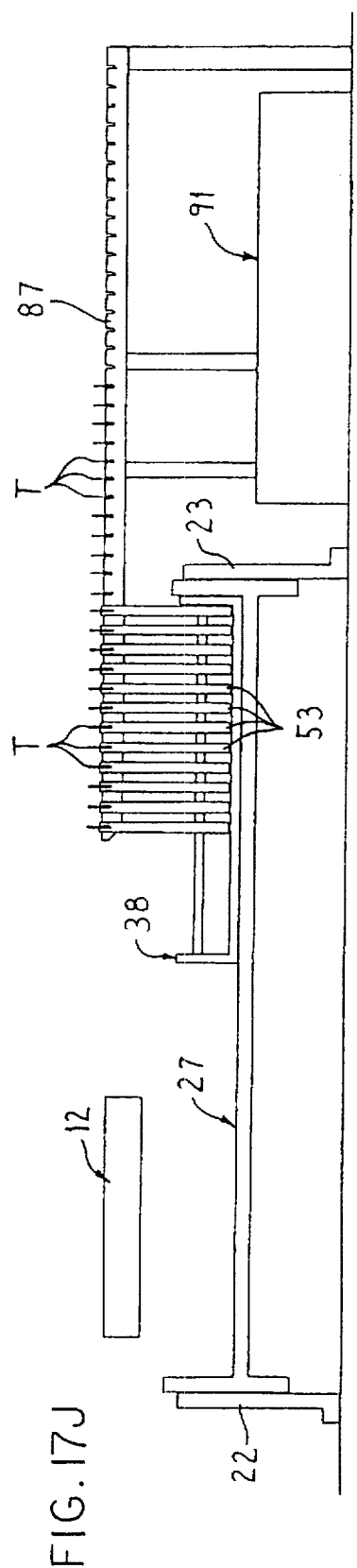

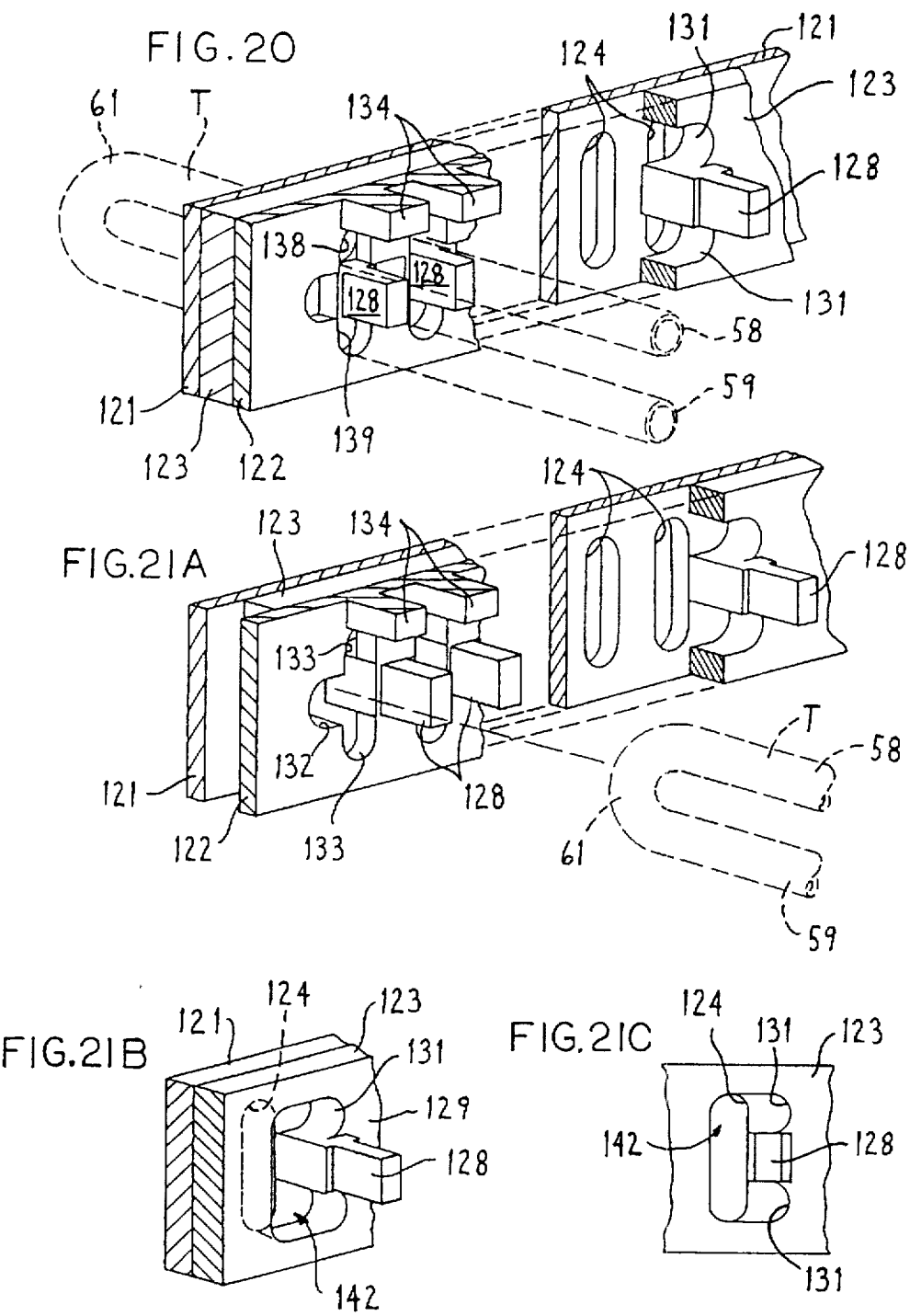

TUBE TRANSFER DEVICE

This is a division of Ser. No. 08/280,877, filed Jul. 26, 1994, , now U.S. Pat. No. 5,632,080.

FIELD OF THE INVENTION

This invention relates to a tube transfer device for use in conveying processed tubes from a station whereat the tubes are processed to a further station whereat further processing of the processed tubes is to take place.

BACKGROUND OF THE INVENTION

It is a desire of manufacturers of processed tubing to be able to convey the processed tubes from one working station to another without requiring an intervention of personnel to effect the aforesaid transfer. Machinery is already known from U.S. Pat. No. 5,233,853, assigned to the same assignee as is the present invention, for stretch straightening tubing drawn from a reel of tubing, cutting same to a predesignated length and then bending it into a hairpin shape. This particular invention arose out of a need to take the bent hairpin tubes from the apparatus disclosed in the aforementioned patent and deliver it to another station for further processing. In this instance, the further station is a lacing station whereat the hairpin tubes are inserted into a stacked array of thin sheet metal sheets having holes punched therein and axially aligned with one another so as to receive the legs of the hairpin tube therein. Devices for automatically lacing tubing into the thin fins, also known as fin plate, is known from U.S. Pat. Nos. 4,543,711 and 4,584,751. However, it has been problematic in effecting an adjustable transfer of the tubing to cause the lateral spacing between mutually adjacent hairpin tubes to be adjusted so as to accommodate varying lateral spacing between axially aligned sets of holes that have been prepunched into the thin sheet metal fins.

Accordingly, it is an object of this invention to provide a tube transfer device wherein sections of tubing are conveyed from one station to another while simultaneously altering the lateral spacing between mutually adjacent tubes.

It is a further object of the invention to provide a tube transfer device, as aforesaid, wherein the transfer is effected without the intervention of personnel assisting the transfer.

It is a further object of the invention to provide a tube transfer device, as aforesaid, wherein the transferred tubes are delivered to a lacing station whereat the tubes are laced into prepunched holes provided in a stack of thin sheet metal fins.

It is a further object of the invention to provide a tube transfer device, as aforesaid, which is part of a system employed for manufacturing heat exchangers.

It is a further object of the invention to provide a tube transfer device, as aforesaid, wherein the tubes are bent into a hairpin shape and the legs thereof are forcibly guided by a mechanism into axially aligned holes prepunched into the stack of thin sheet metal fins.

It is a further object of the invention to provide a tube transfer device, as aforesaid, wherein the forcible guiding of the legs of the hairpin tubes includes structure for facilitating the removal of a section of the guide to facilitate the movement of the 180° bend inter-connecting a common end of each of the mutually adjacent legs of the hairpin tubes past the guide structure and toward the endmost sheet of the stack of thin sheet metal fins.

It is a further object of the invention to provide a tube transfer device, as aforesaid, which is durable and easy to maintain and inexpensive to operate.

SUMMARY OF THE INVENTION

In general, the objects and purposes of the invention are met by providing a tube transfer device which includes a tube conveyor for transporting processed tubes from an entry location to an exit location thereon. The tube conveyor includes a plurality of first tube holders thereon which are adapted to hold the processed tubes so that axes thereof will extend parallel to one another and be laterally spaced apart a first distance from one another at the aforesaid entry location. A movable tube shuttle is provided for shifting processed tubes between a first position and a second position located adjacent the aforesaid entry location to the tube conveyor. The tube shuttle includes movable second tube holders adapted to receive the processed tubes when at the aforesaid first position and while maintaining a second distance between the processed tubes. The tube shuttle also includes structure for varying the lateral spacing between the processed tubes on the second tube holders from the second distance to the first distance and in response to a movement of the tube shuttle between the first position and the second position so that the processed tubes will be spaced at the first distance from one another when the tube shuttle is at the entry location to the tube conveyor. A device for transferring the tubes on the tube shuttle to the tube conveyor is provided.

DESCRIPTION OF THE DRAWINGS

Further objects and purposes of this invention will be apparent to persons acquainted with apparatus of this general type upon reading the following specification and inspecting the accompanying drawings, in which:

FIG. 4 is a left-top isometric view of a tube holder on the tube shuttle;

FIG. 5 is a sectional view taken along the line 5—5 of FIG. 4;

FIG. 6 is a left-bottom isometric view of a tube holder on the tube shuttle;

FIG. 10 is a sectional view taken along the line 10—10 of FIG. 7;

FIG. 11 is an isometric view of a plurality of stops provided on a removable plate for controlling the path of movement of the tube holders on the tube shuttles;

FIG. 12 is a further embodiment of the stop mechanism utilized to control the path of movement of the tube holders on the tube shuttle;

FIG. 13 is a sectional view taken along the line 13—13 of FIG. 12;

FIG. 14 is a fragmentary isometric view of the further embodiment of the stop mechanism utilized for facilitating a variable control of the path of movement of the tube holders on the tube shuttle;

FIG. 15 illustrates a first position of an oscillatory tube conveyor device;

FIG. 16 illustrates a second position of the oscillatory tube conveyor device illustrated in FIG. 15;

FIG. 17A is a side elevational view of the tube shuttle and the tube conveyor with the tube shuttle being in a first position thereof and unloaded;

FIG. 17B is a view similar to FIG. 17A, except that the tube shuttle has now been loaded with processed tubes;

FIG. 17C is a view similar to FIG. 17B, except that the tube shuttle has been moved to a position intermediate the initial first position thereof and the final second position thereof;

FIG. 17D illustrates the tube shuttle in its final second position with the tube holders thereon being moved to a second spacing;

FIG. 17G is a view similar to FIG. 17F, except that the tube shuttle has reached the first initial position thereof and the tube conveyor is in the process of furthering the movement of the processed tubes from one location to another;

FIG. 17H is a view similar to FIG. 17B, except that the processed tubes previously delivered to the conveyor have now been lifted off from a stationary section of the tube conveyor and are about to be shifted laterally to the right;

FIG. 17I is a view similar to FIG. 17C, except that the processed tubes previously delivered to the tube conveyor have now been successfully transferred to a further location on the stationary section of the tube conveyor;

FIG. 17J is a view similar to FIG. 17D, wherein the tube shuttle is in the process of delivering additional processed tubes to the stationary portion of the tube conveyor adjacent the previously positioned processed tubes;

FIG. 20 is an enlarged isometric view of the structure illustrated in FIG. 19 with a portion of the structure being removed for clarity purposes;

FIG. 21A is a further isometric view of the structure illustrated in FIG. 19 with a portion of the mechanism having been shifted to the right to facilitate passage of the 180° bend of the hairpin tube through the guide structure;

FIGS. 21B and 21C are fragments of FIG. 21A, FIG. 21C being a frontal view;

DETAILED DESCRIPTION

Figure 1:
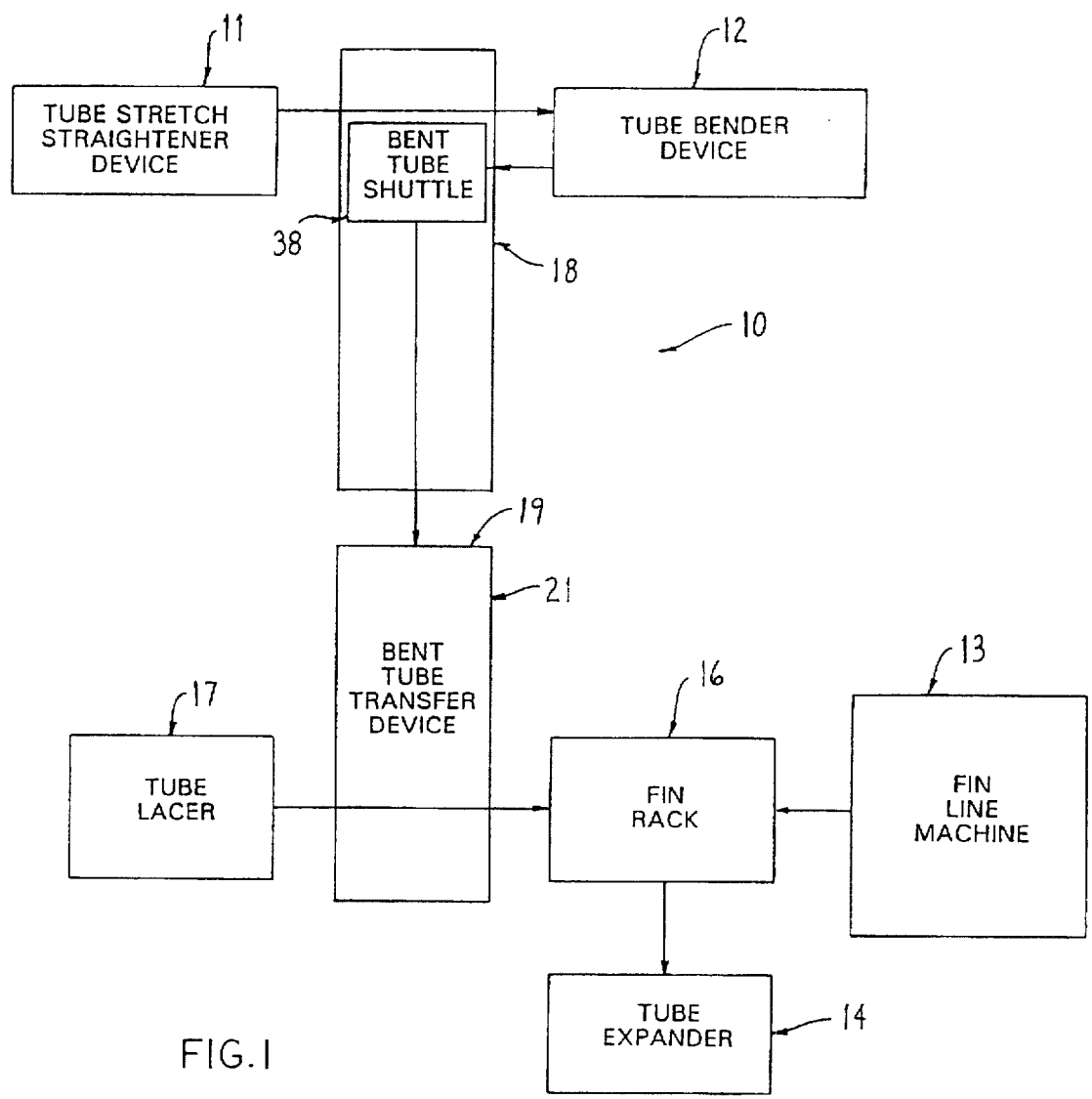
FIG. 1 is a schematic diagram of a tube processing system utilized in the manufacture of heat exchangers and which embodies the invention.

Certain terminology will be used in the following description for convenience in reference only and will not be limiting. The words "up", "down", "right" and "left" will designate directions in the drawings to which reference is made. The words "forwardly" and "rearwardly" will refer to directions of processed tube movement through the device, "forwardly" being the normal movement direction. The words "in" and "out" will refer to directions toward and away from, respectively, the geometric center of the device and designated parts thereof. Such terminology will include the words above specifically mentioned, derivatives thereof and words of similar import.

FIG. 1 illustrates a system 10 for facilitating the manufacture of heat exchangers. If desired, the system 10 can be a tube processing device, such as a tube stretch straightener device 11 and a tube bender device 12 that are the subject matter of U.S. Pat. No. 5,233,853, assigned to the same assignee as is the present invention, the disclosure of which is to be incorporated herein by reference. A fin line machine 13 is provided and can, if desired, be like that disclosed in U.S. Pat. No. 4,195,540, also assigned to the same assignee as is the present invention. A tube expander 14 can, if desired, be of the type disclosed in U.S. Pat. No. 5,003,691, also assigned to the same assignee as is the present invention. The disclosures in U.S. Pat. No. 4,195,540 and U.S. Pat. No. 5,003,691 are to be incorporated herein by reference. The fin rack 16 can, if desired, be of the type illustrated in the aforementioned U.S. Pat. No. 4,195,540. That is, the plurality of cut to size fins are oriented in a rack organizing the fins into a stacked array or column. The tube lacer 17 can also be of any conventional variety for facilitating a movement of the tubes into holes prepunched into each sheet of the stacked array of fins, which holes are also organized into an axially aligned arrangement so as to facilitate the insertion of the processed tubes into the holes by the tube lacer 17. Conventional devices for driving the tubes into the holes provided in the stacked array of fins are disclosed in the above-referenced U.S. Pat. Nos. 4,543,711 and 4,584,751. The disclosures in U.S. Pat. Nos. 4,543,711 and 4,584,751 are to be incorporated herein by reference.

Straight or bent processed tubes T from the stretch straightener device 11 or the tube bender device 12 are carried by a tube shuttle mechanism 18 from a location adjacent the tube stretch straightener device 11 and bender device 12 to the entry location 19 of a tube conveyor device 21. Details concerning the tube shuttle mechanism 18 and its relationship to the tube conveyor device 21 and, in turn, the relationship between the tube conveyor device and the tube lacer 17 so as to facilitate insertion of processed tubes into axially aligned holes prepunched into a stacked array of fins organized in a column on a fin rack 16 will be set forth in more detail below.

Figure 2:
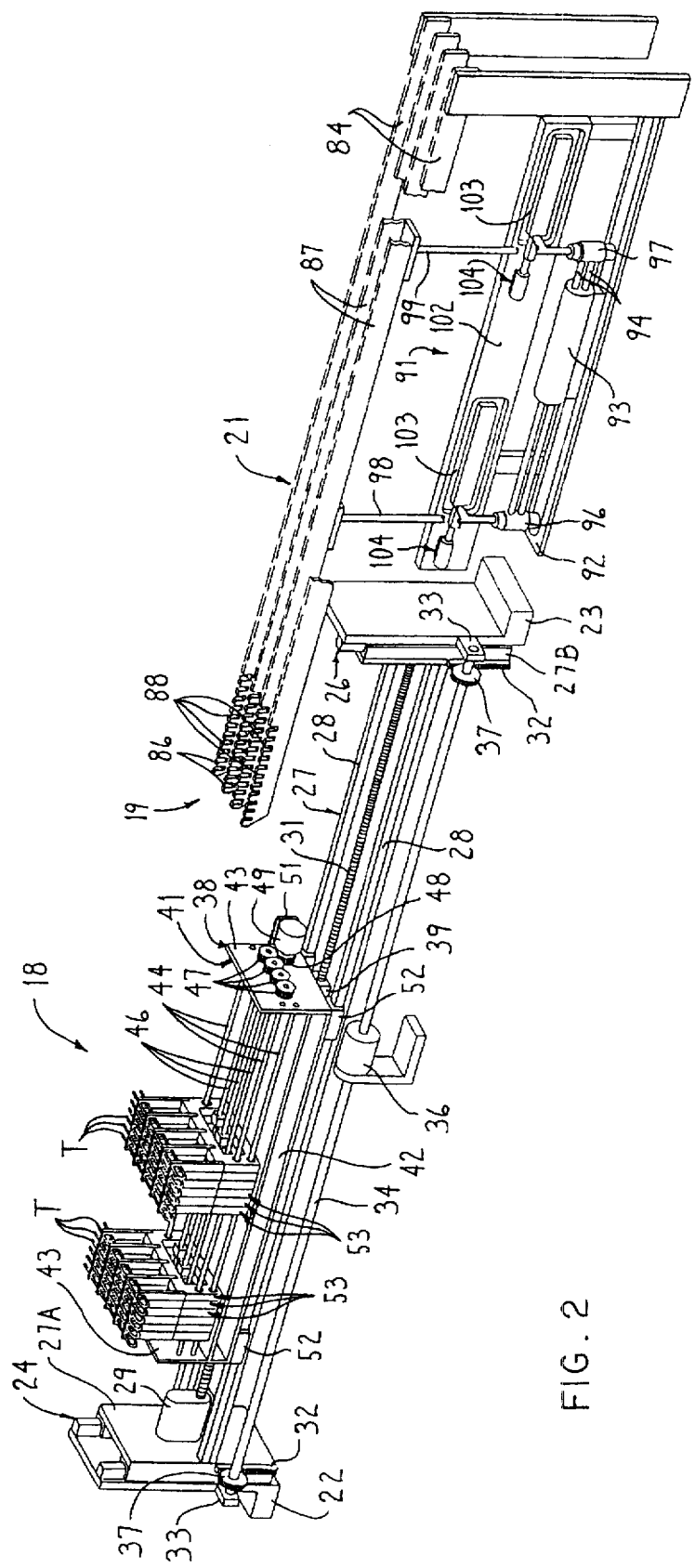
FIG. 2 is an isometric view of a tube shuttle device embodying the invention.
Figure 3:
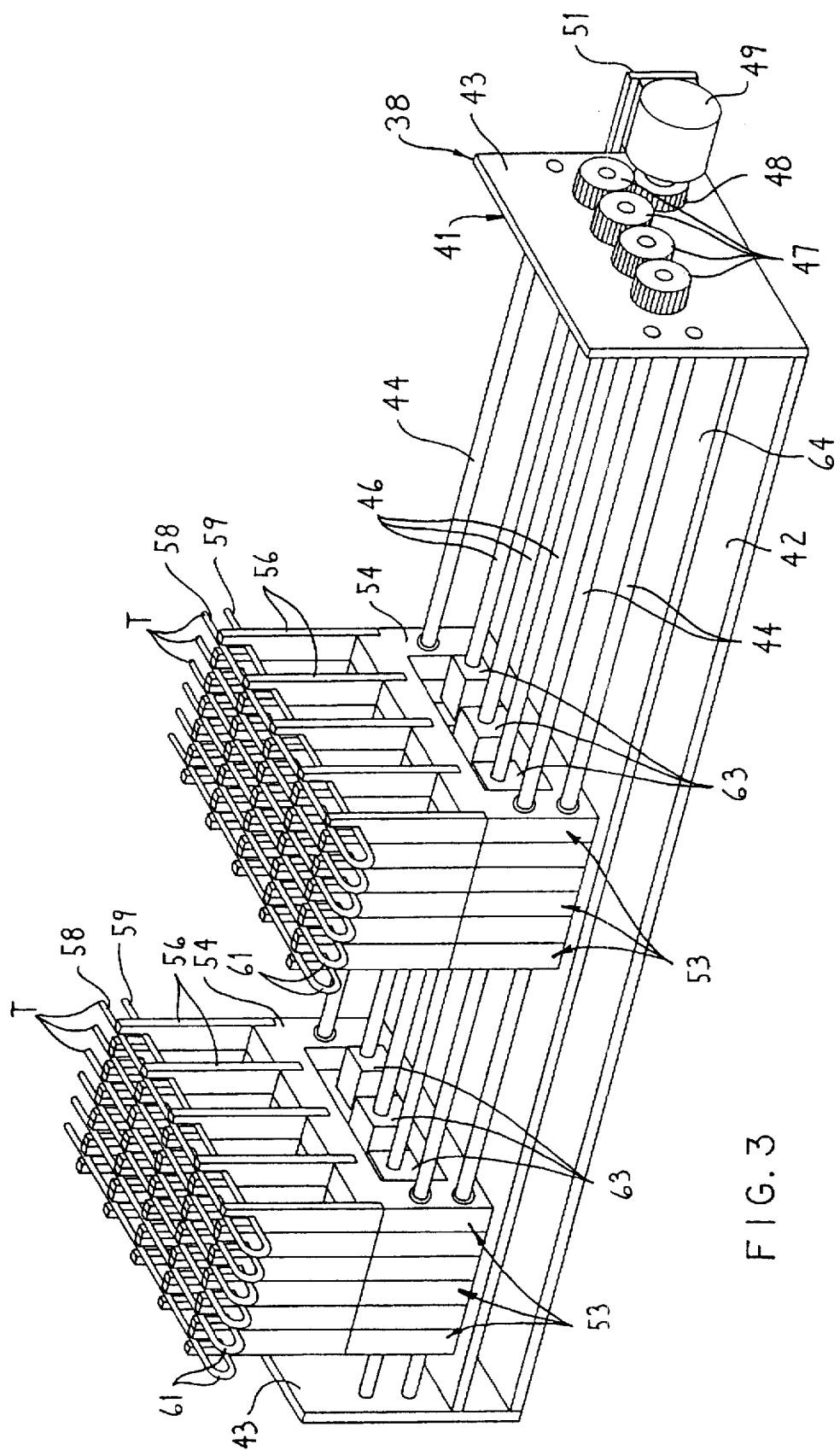
FIG. 3 is an enlarged fragment of a portion of the tube shuttle.

FIG. 2 illustrates the relationship between the tube shuttle mechanism 18 and the tube conveyor mechanism 21. Portions of the tube shuttle mechanism 18 have been omitted for purposes of enhancing the clarity of the following disclosure. A pair of spaced and fixedly oriented upstanding column members 22 and 23 supported on a support surface are provided. Each upstanding column member 22 and 23 includes a vertically extending guide track 24 and 26, respectively, thereon. A carriage 27 is provided and moves vertically up and down on the guide tracks 24 and 26. More specifically, the carriage 27 includes a pair of carriage frames 27A and 27B guided for vertically up and down movement on the aforesaid guide tracks 24 and 26, respectively. The carriage 27 also includes a plurality of parallel extending guide bars 28 connected to and extending between the two carriage frames 27A and 27B. An electric servomotor 29, or an equivalent thereto, is fixedly mounted to the carriage frame 27A and rotatably drives in selected directions of rotation an externally threaded screw 31 that extends between the servomotor 29 and an appropriate support bearing (not shown) provided on the carriage frame 27B. Each carriage frame 27A and 27B includes an elongated and straight toothed gear rack 32 oriented parallel to one another and, in this particular embodiment, oriented so as to extend vertically up and down as shown in FIG. 2. Each vertically upright column member 22 and 23 includes a shaft bearing structure 33 having a bearing opening therein axially aligned with the other so as to rotatably support an elongated shaft 34 therein. In this particular embodiment, an electrically driven servomotor 36 is provided and rotatably drives the shaft 34 in selected opposite directions of rotation. A pinion gear is fixedly secured to the shaft 34 at each end thereof and the teeth thereof are operatively engaged with the teeth provided on the gear rack 32. As a result, when the shaft 34 is rotatably driven by the motor 36, the gears 37 will be rotated so as to cause the carriage 27 to be moved up and down relative to the stationarily positioned upstanding column members 22 and 23 and the stationarily mounted motor 36.

The tube shuttle mechanism 18 also includes a further carriage 38 slidably mounted on the guide bars 28 and adapted to move between the limits defined by the carriage frames 27A and 27B. The carriage 38 includes a frame 41 which, in this particular embodiment, is an upwardly opening U-shaped frame having a bottom wall 42, extending in a plane generally parallel to a horizontal plane defined by the guide bars 28, and upstanding end walls 43. A plurality of guide bars 44 are connected to and extend between the end walls 43 generally parallel to the bottom wall 42. A plurality of driven shafts 46 are rotatably supported on the end walls 43 and also extend parallel to the guide bars 44. One end of each of the drive shafts 43 extends through, in this particular embodiment, the rightmost end wall 43 (see FIG. 2) and has a gear 47 fixedly secured thereto. Each of the gears is externally toothed and the teeth are in meshing engagement with one another as well as with a drive gear 48 provided on a servomotor 49, which servomotor 49 is mounted on a bracket 51 secured to the rightmost end wall 43 of the frame 41.

A plurality of guide shoes 52 are secured to the underside of the bottom wall 42 of the frame 41. The guide shoes 52 are slidably mounted on the guide bars 28 in order to facilitate a sliding movement of the further carriage 38 between the position illustrated in FIG. 2 and a further location oriented more closely to the entry location 19 of the tube conveyor 21 as will be explained in more detail below. The carriage 38 also includes an internally threaded nut 39 secured to the underside of the bottom wall 42 of the frame 41. The nut 39 is threaddedly engaged with the externally threaded screw 31. As a result of a rotation of the screw 31 in opposite rotative directions by the servomotor 29, the carriage 38 will be moved either to the left (forward) or the right (rearward) as illustrated in FIG. 2.

A plurality of tube holders 53 are slidably mounted on the guide bars 44 of the tube shuttle 18. In this particular embodiment, there are two groups of six tube holders 53. Thus, the tube holders 53 can accommodate a total of twelve processed tubes T as will be explained in more detail below.

Each tube holder 53 includes an annular frame 54, which frame is, in this embodiment, generally rectangular in shape. The lateral side portions of the annular frame 54 include guide holes for slidably receiving therein the aforementioned guide bars 44. The uppermost portion of the annular frame 54 has a plurality of upstanding supports 56 secured thereto, which supports have in the uppermost region thereof an upwardly opening U-shaped slot 57. The U-shaped slots 57 are axially aligned in a lateral direction with one another and are adapted to receive therein either a straight tube or a U-shaped tube T having parallel legs 58 and 59 interconnected at a common end by a 180° bent section 61. In this particular embodiment, the legs 58 and 59 are oriented in a vertical plane one above the other. The straight tube has not been shown in the drawings. As is best shown in FIG. 6, each annular frame 54 has a fixed peg or the like 62 projecting from a bottom edge thereof, the purpose of which will be explained below.

Each of the tube holders 53 is driven lengthwise of the guide bars 44 by a linear actuator 63 which is responsive to rotations of the drive shaft 46. The drive shafts 46 each have a smooth exterior surface and the linear actuators have a plurality of precision ball bearings therein mounted on an angle relative to the draft shaft axis so as to convert the drive shaft rotation into proportional linear travel. The linear actuators used for this particular embodiment are marketed under the federally registered trademark ROH'LIX® currently owned by Zero-Max, Inc. of Plymouth, Minn. One such type of ROH'LIX® linear actuator is disclosed in U.S. Pat. No. 3,272,021.

Figure 7:
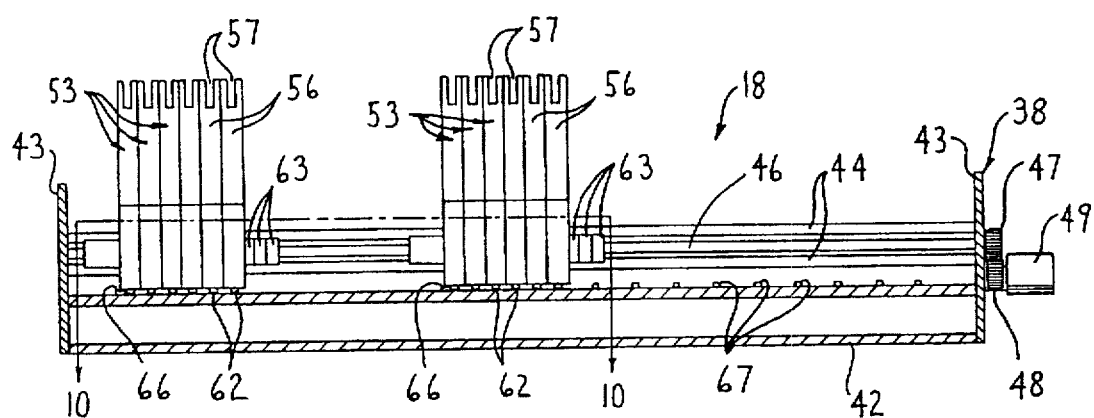
FIG. 7 is a sectioned side elevational view of the tube shuttle with the tube holders at a first position thereof.

The further carriage 38 of the tube shuttle 18 includes a further plate 64 (FIG. 9) oriented immediately above the bottom wall 42. The plate 64 includes a plurality of stops 66 and 67 thereon, the stops 67 being oriented in a path of movement of the pegs 62 projecting downwardly from an associated tube holder 53 so as to limit the movement of the tube holders 53 to specified positions oriented at both the left end (FIG. 7) and the right end (FIG. 8) of the tube shuttle 18. That is, when the drive shafts 46 are rotated in one direction of rotation, the tube holders 53 will be force oriented at the left end of the tube shuttle 17 as depicted in FIG. 7 with the stop 66 limiting the leftward movement of the tube holders. A rotation of the drive shafts 46 in an opposite direction of rotation will cause the linear actuators 63 to move forwardly to the right from the FIG. 7 position to the FIG. 8 position until the pegs 62 contact an associated stop 67. One of the interesting features of the ROH'LIX® linear actuator is that the drive shafts 46 can be rotated for any period of time sufficient to cause all of the tube holders 53 to reach its designated location. If one such tube holder should reach its destination before another does, the ROH'LIX® linear actuator will allow the associated drive shaft 46 to continue to rotate without any detrimental harm to either the linear actuator or the exterior surface of the drive shaft 46. This feature is true for rotation of the drive shafts 46 in either direction of rotation. Thus, timing of the interval of operation for the motor 49 is not particularly critical. Appropriate proximity switches can, if desired, be employed to assure proper positioning and to provide alarm activation if proper positioning has not been achieved.

FIG. 10 illustrates a unique aspect of this invention, namely, the manner in which each of the linear actuators 63 is secured to a respective one of the tube holders 53 by a plurality of screws 68. Further, a plurality, here three, of such linear actuators 63 are mounted on each of the drive shafts 46. The spacing of the linear actuators 63 along the length of the drive shafts 46 enables the tube holders 53 to be oriented so that mutually facing surfaces of mutually adjacent tube holders 53 will abut one another in two groups of six tube holders as illustrated in FIGS. 7 and 10.

Figure 8:
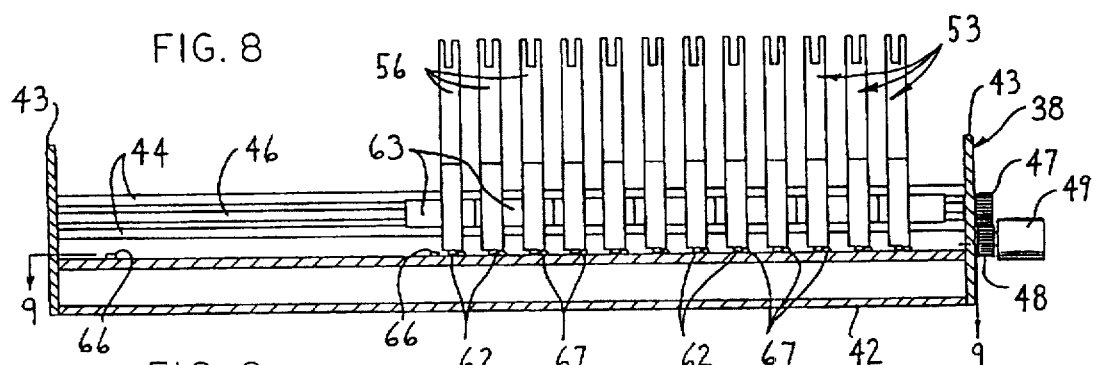
FIG. 8 is a sectioned view of the tube shuttle similar to FIG. 7, but with the tube holders in a second position thereof.
Figure 9:
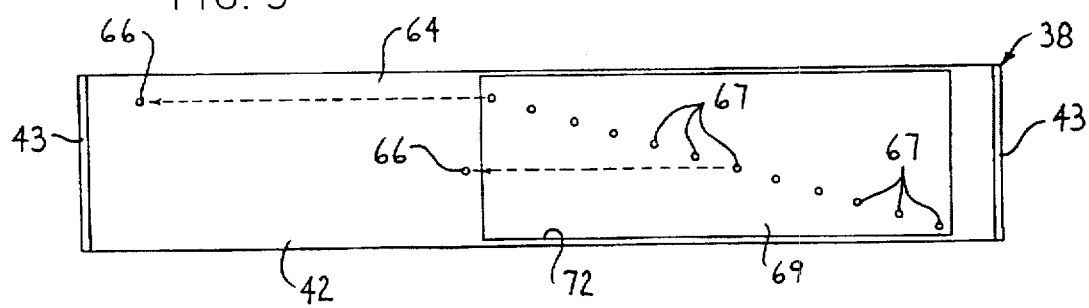
FIG. 9 is a sectional view taken along the line 9—9 of FIG. 8.

FIG. 9 illustrates a still further plate 69 being mounted on top of the plate 64. The further plate 69 includes the aforementioned plurality of stops 67 oriented in the same manner as they are provided on the upper surface of the plate 64 as shown in FIGS. 7 and 8. However, and in FIG. 9, the plate 69 is removable and replaceable with a further plate 71 (FIG. 11) having a differing pattern of stops 67 thereon so as to vary the spacing between the tube holders 53 when the tube holders 53 reach the rightmost end of the tube shuttle 18 as depicted in FIG. 8. In this particular embodiment, the plate 69 (or 71) is recessed into an opening 72 provided in the plate 64 so that the upper surface of the plates 69 and 71 will be flush with the upper surface of the plate 64.

FIGS. 12–14 illustrate a further embodiment of a substitute plate 73 having a plurality of stations 74 defined by upwardly opening holes through which can project an elevatable pin 76 as illustrated in FIGS. 13 and 14. In this particular embodiment, the elevatable pin 76 is supported for vertical movement in the openings 74. A cam 77 is slidably movable for back and forth motions in direction of the arrow 78. The cam 77 has an inclined surface 79 on which a lower end of the pin 76 will slide to effect a raising or a lowering of the pin based on whether the cam 77 is moved either to the left or to the right in FIGS. 13 and 14. FIG. 13 illustrates the position of a pair of cams 77 relative to a pair of pins 76 for both a raised and a lowered position of the two pins 76. A pneumatic cylinder or an electric servomotor 81 can be utilized for effecting a reciprocatory drive of the cam 77 through a conventional connection mechanism 82 as illustrated in FIG. 14. A control mechanism 83 can be utilized for controlling which of the servomotors 81 is energized to raise or lower an associated pin 76. This mechanism enables a quick adjustment of the position of each of the tube holders 53 when the tube holders 53 are at the position illustrated in FIG. 8, namely, adjacent the entry location 19 to the tube conveyor 21.

FIGS. 15 and 16 illustrate an exemplary embodiment of a tube conveyor 21. This type of conveyor is somewhat conventional and is oftentimes referred to as an oscillatory conveyor. The tube conveyor 21 comprises a plurality of stationary tube racks 84 (FIG. 16) which extend parallel to one another and have a plurality of upwardly opening slots 86 therein adapted to receive processed tubes T in a manner very similar to the manner in which the processed tubes T are received in the slots 57 in the tube holders 53. The tube conveyor 21 also includes an oscillatory tube rack 87 also having upwardly opening processed tube receiving slots 88 therein. The tube racks 84 and 87 are essentially identical to one another except that structure is provided for oscillating the tube rack 87 relative to the tube rack 84.

The mechanism for driving the oscillatory tube rack 87 relative to the stationary tube rack 84 is also illustrated in FIGS. 15 and 16 and is generally indicated by the reference numeral 91. The drive mechanism 91 includes a base plate 92 on which is mounted a drive cylinder 93 adapted to reciprocate a pair of parallel rods 94 horizontally parallel to the upper surface of the plate 92. A pair of drive cylinders 96 and 97 are affixed to opposite ends of the elongated rods 94, with each drive cylinder 96 and 97 having an upstanding rod 98 and 99, respectively, projecting therefrom. The oscillatory tube racks 87 are fixedly secured to and driven for movement by the rods 98 and 99. A cam follower 101 is mounted on each of the rods 98 and 99.

The drive mechanism 91 also includes a guide plate 102 having a pair of rectangular shaped cam paths 103 therein and into which is received the cam follower 101. A pair of stop mechanisms 104 are provided on the guide plate 102 and each are adapted to control a precise location of the cam follower 101 in a cycle of operation. The initial position of the oscillatory drive mechanism 91 for the tube conveyor 21 is illustrated in FIG. 15. The stop mechanisms 104 are extended to hold the cam follower 101 so that the tube racks 84 and 87 are horizontally aligned and the slots 86 and 88 are axially aligned in a lateral direction. A control mechanism 106 is provided for sequentially operating the drive cylinder 93 as well as the drive cylinders 96 and 97 and the stop mechanisms 104 to cause the cam follower 101 to move in the cam paths 103 throughout a cycle of operation illustrated in FIGS. 15 and 16. That is, each of the cam followers 101 is driven in a clockwise manner around the cam paths 103 until the stop mechanisms 104 engage the cam followers to bring the cam racks 84 and 87 into an initial alignment again. It is believed obvious from comparing FIGS. 15 and 16 that the drive cylinders 97 and 98 effect a simultaneous raising and lowering of the oscillatory tube rack 87 in order to effect a lifting and a longitudinal movement of any tubes that may be present in the slots 88 so that they can be reoriented relative to the slots 86 in the stationary tube rack 84.

Any change in spacing between the respective slots 86 and 88 can be accommodated by the tube spacing control devices shown in FIGS. 11–14.

FIGS. 17A–17J set forth an operative sequence of a combined tube shuttle 18 and tube conveyor 21. In interpreting the following operative sequence, a casual reference to FIG. 2 will be helpful. The control mechanism 106 illustrated in FIGS. 15 and 16 also controls the operative sequence for the tube shuttle 18.

Figure 17E:
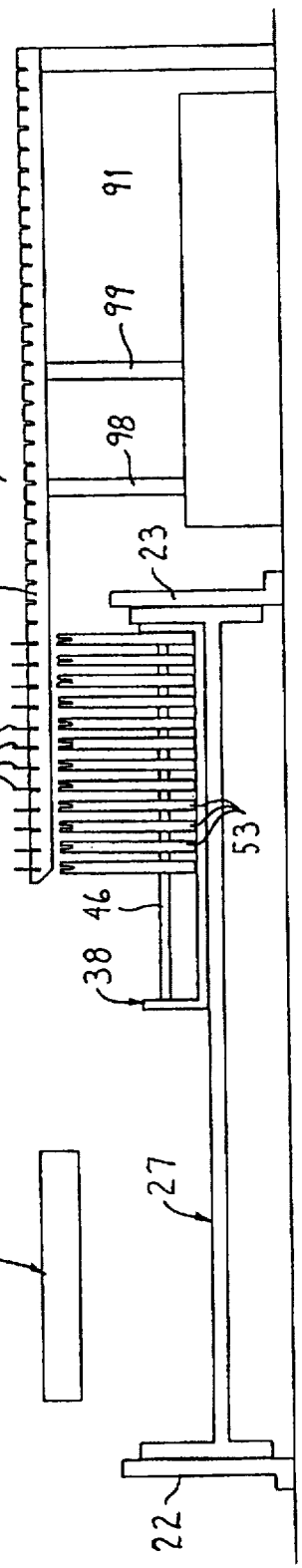
FIG. 17E is a view similar to FIG. 17D, except that the tube shuttle has been lowered so as to leave the processed tubes on the conveyor.
Figure 17F:
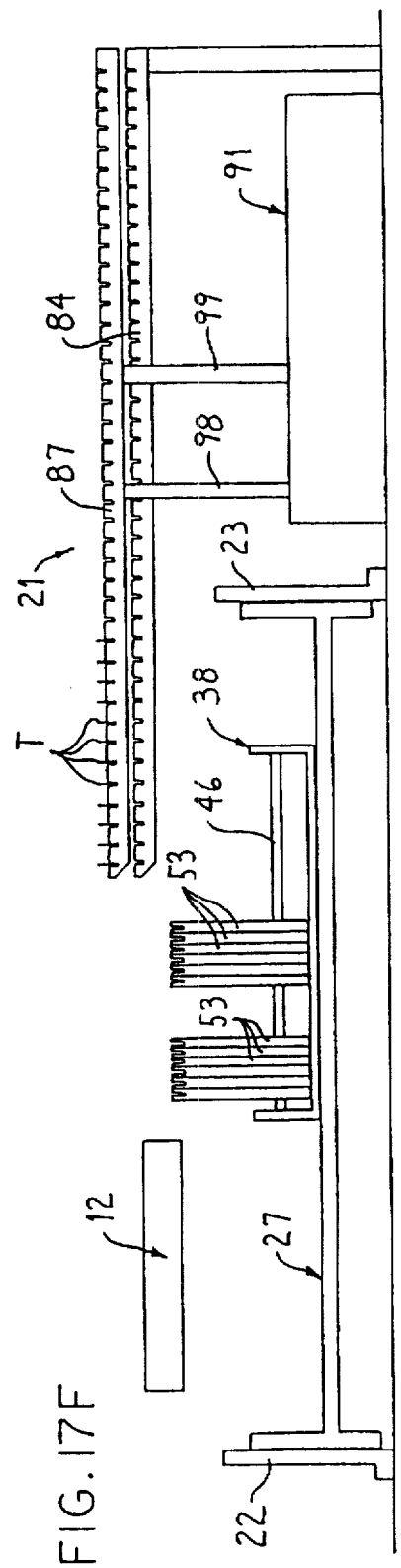
FIG. 17F is a view similar to FIG. 17E, except that the tube shuttle is in the process of moving back to its initial first position while the tube conveyor is in the process of shuttling the processed tubes from one position thereon to another.

FIG. 17A illustrates the initial position of the tube shuttle 18 and is awaiting the receipt of processed tubes T from either of the tube processing devices 11 or 12. FIG. 17B indicates that processed tubes T have been ejected from the tube bender 12 and into the slots 57 of each tube holder 53 in the two sets of tube holders. FIG. 17C illustrates that the carriage 38 is at a position intermediate the tube entry location 19 of the tube conveyor 21 and the tube bender 12. Important to note here is that the carriage 27 has been elevated relative to the vertically upstanding columns 22 and 23. Thus, the height of the processed tubes T is oriented above the uppermost surface of the tube racks 84 and 87. FIG. 17D illustrates that the drive shafts 46 on the carriage 38 have been driven for rotation by the motor 49 so as to cause the ROH'LIX® linear actuators to effect a movement of the respective tube holders 53 along the length of the drive shafts 46 to spaced locations determined by the spacing of the stops 67 (FIG. 8). FIG. 17E illustrates that the carriage 27 has been lowered to its lowermost position so as to cause the processed tubes T previously held in the tube holders 53 to be deposited into the aligned slots 86 and 88 in the tube racks 84 and 87, respectively. FIG. 17F indicates that the carriage 38 is now in transit back (leftwardly) toward its initial position illustrated in FIG. 17A. It is also to be noted that the drive shafts 46 have been rotated in an opposite direction to cause the tube holders 53 to be returned to their initial two groupings of six tube holders caused by the rightmost tube holder 53 in each of the two groups contacting a stop 66 as shown in FIG. 7. FIG. 17F also indicates that the drive mechanism 91 for the tube conveyor 21 has, in the meantime, been activated to raise the oscillatory tube rack 87 above the plane of the stationary tube rack 84. It will be noted that the height to which the oscillatory tube rack 87 has been lifted relative to the stationary tube rack 84 is slightly greater than that illustrated in FIG. 16. The difference in the height of movement of the oscillatory tube rack has been purposefully done in order to render the following discussion more clear. FIG. 17F illustrates that the carriage 38 has reached its initial position of FIG. 17A while the oscillatory tube conveyor 21 continues to operate causing the oscillatory tube rack 87 to be shifted to its rightmost position above the stationary tube rack 84. The twelve previously processed tubes T carried by the oscillatory tube rack 87 are now positioned above the upwardly opening slots 86 of the stationary tube rack 84. FIG. 17H illustrates that the tube holders 53 on the carriage 38 have again been supplied with additional processed tubes T while the oscillatory tube rack 87 has now been shifted to a position below the stationary tube rack 84 so as to have caused the previously processed tubes T to be deposited into the upwardly opening slots 86 of the stationary tube rack 84. It will be noted from FIG. 17H that the end of the stationary tube rack 84 adjacent the entry location 19 now has twelve free slots for reception of the newly processed tubes T currently at a location adjacent the tube bender 12. FIGS. 17I and 17J are virtually identical to FIGS. 17C and 17D so that further discussion concerning the operative sequence of depositing the further processed tubes T onto the tube racks 84 and 87 is deemed unnecessary.

Figure 18:
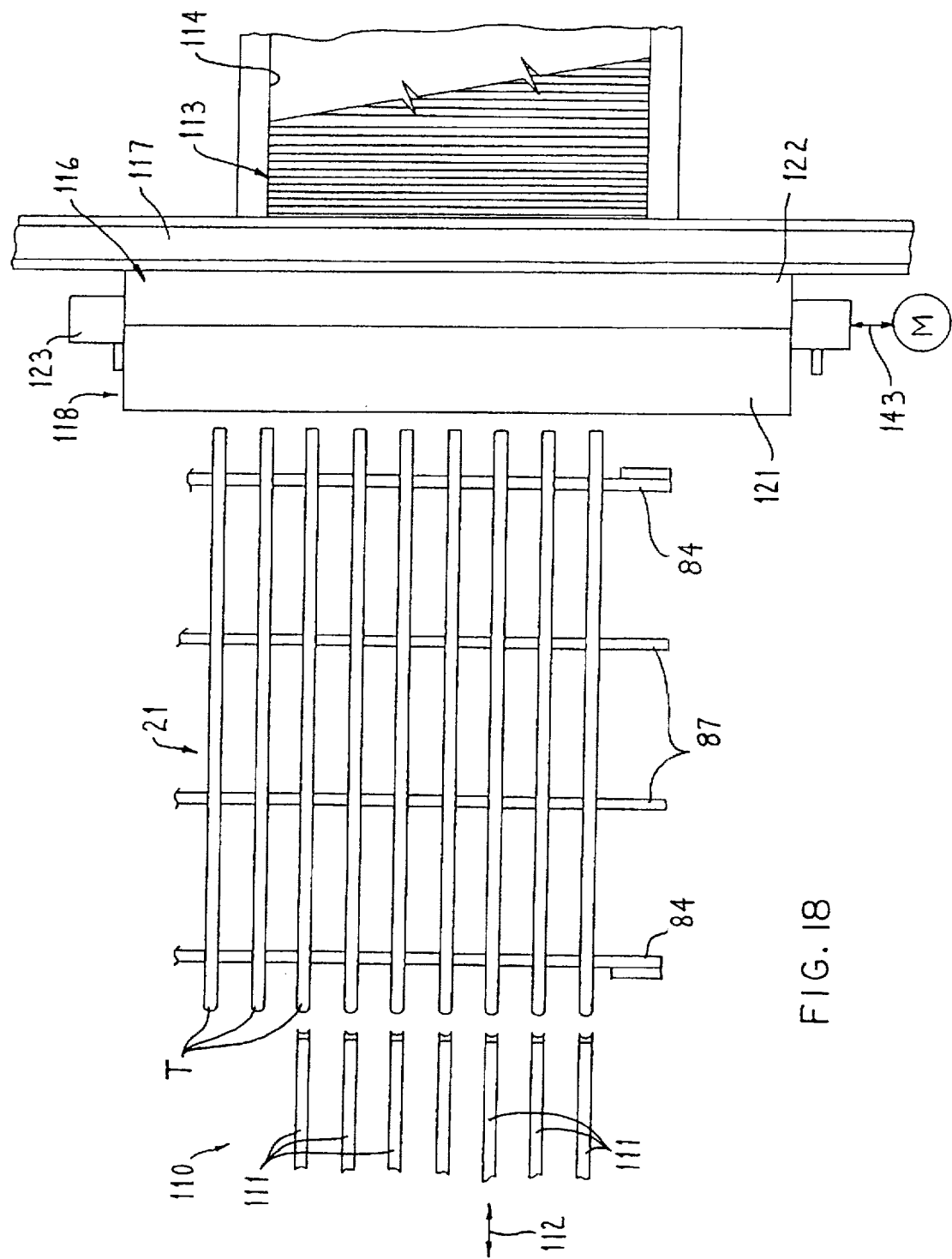
FIG. 18 is a top view of a tube lacing station and a tube guiding mechanism incorporated thereat.
Figure 19:
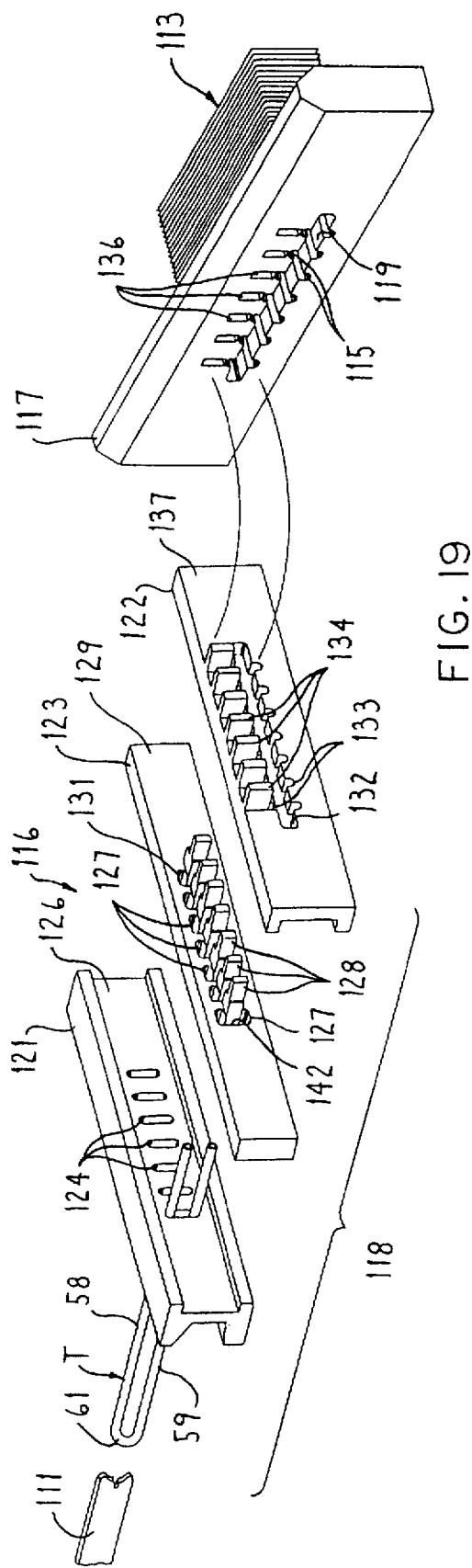
FIG. 19 is an isometric exploded view of the tube guiding mechanism for guiding the legs of a U-shaped hairpin bent tube into the openings provided in a stacked array of thin sheet metal fins.

A further tube transfer system 110 is illustrated in FIGS. 18–22D. This further tube transfer system 110 is oriented at or adjacent the rightmost end of the tube conveyor 21 illustrated in FIGS. 2, 15 and 16. As FIG. 18 illustrates, a plurality of processed tubes T, here hairpin bent tubes (which could just as well be straight tubes), are oriented on the tube conveyor 21 so that tube transfer bars 111 supported for reciprocal movement in direction of the arrow 112 can effect an ejection of the processed tubes T from the tube conveyor 21 and into a laced relationship with a stacked array of thin sheet metal fins 113 oriented in a trough 114. A guide mechanism 116 is provided intermediate the tube conveyor 21 and the trough 114 and the stacked array of fins 113 therein to facilitate an insertion of the legs 58 and 59 (FIG. 5) of the processed tubes T into prepunched holes 141 (FIG. 22A) in the fins 113, which holes are axially aligned with one another and with the associated legs 58 and 59 of each processed tube T oriented for transfer by the transfer rods 111. The guide mechanism 116 is illustrated in more detail in FIGS. 19–21C. As FIG. 19 clearly depicts, the guide mechanism 116 is composed of an end wall 117 for the trough 114 (not shown in FIG. 19) and a gate mechanism 118 for guiding the legs 58 and 59 into an elongated laterally extending slot 119 in the wall 117, which slot has a plurality of recesses 115 provided along both the upper and lower surface of the slot 119. The gate mechanism 118 prevents the legs 58 and 59 from moving toward and away from one another. The gate mechanism 118 is comprised of two components 121 and 122 which are fixedly secured to one another and a third component 123 which is movable relative to the components 121 and 122. The component 121 of the gate mechanism 118 has a plurality of through slots 124 therein for facilitating a reception of processed tubes T therethrough. The upper and lower extremities of each slot 124 is adapted to snugly and slidingly engage the legs 58 and 59 of the processed tubes T so as to prevent the legs from moving away from one another. The rightmost face of the component 121 has a trough 126 therein slidably receiving the movable component 123. The movable component 123 includes a plurality of C-shaped slots 127 with a tongue 128 projecting outwardly from the rightmost face 129 of the component 123 and at a location that is aligned with and between the legs 131 (FIG. 20) of the C-shaped slot 127. The legs 131 of the C-shaped slot 127 are axially aligned with the slots 124 in the component 121 so that the legs 58 and 59 of each processed tube T will straddle the tongues 128 as illustrated in FIG. 20. As FIG. 19 best depicts, the component 122 includes a laterally extending slot 132 therein with a plurality of recesses 133 provided along both the upper and lower surfaces of the slot 132 so as to accommodate a reception of the legs 58 and 59 passing through the components 121 and 123. This slot and recess combination mirrors the slot 119 and recess 115 in the wall 117. Above each set of recesses 133 there is provided a rightwardly extending tongue 134. The end wall 117 has a plurality of receptacles 136 oriented immediately above the slots 115, 119. As is illustrated in FIG. 20, the tongues 128 and 134 project an equal distance from the rightmost surface 137 of the gate component 122 with the tongues 128 being received in the slot 119 and the tongues 134 being received in the receptacles 136 when the legs 58 and 59 of the processed tubes are to be guided into the prepunched holes 141 provided in the stacked array of fins 113.

Figure 22A:
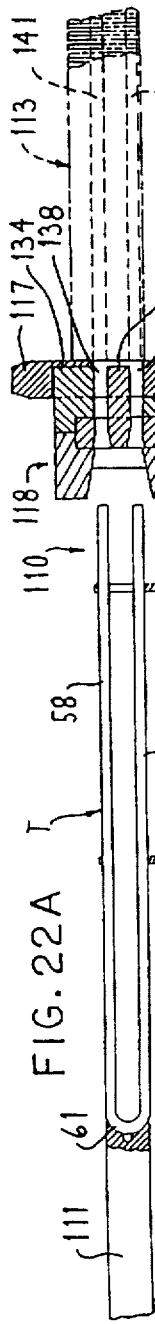
FIGS. 22A–22D are each side views of the tube guide mechanism and illustrating the manner in which a hairpin tube is guided into the prepunched holes provided in a stacked array of thin sheet metal fins.
Figure 22B:
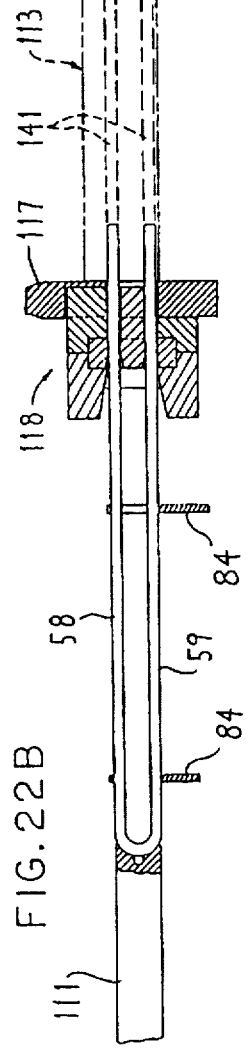
Figure 22C:
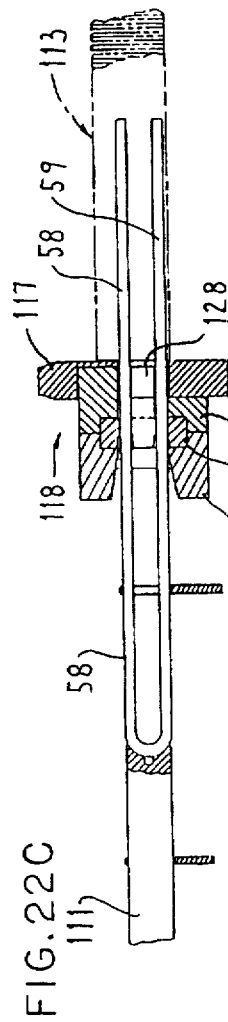
Figure 22D:
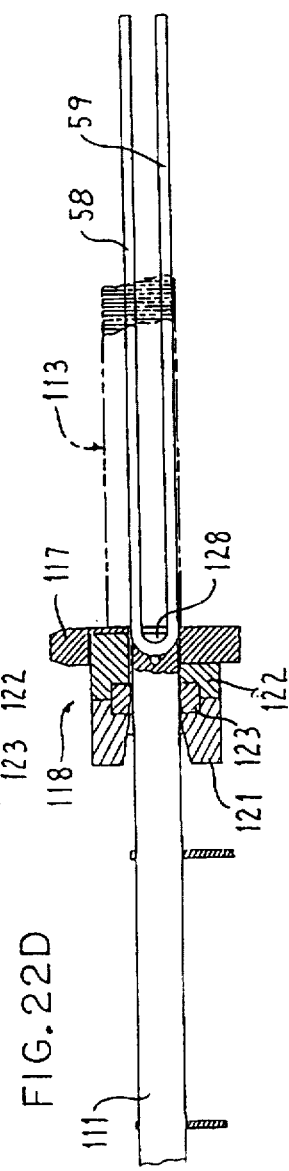

FIGS. 22A–22D illustrate a sequence of operation of the tube transfer system 110. As is depicted in FIG. 22A, and with the movable component 123 of the gate mechanism 118 being oriented in the position illustrated in FIG. 20, the legs 58 and 59 of the processed tube T are to be inserted into a pair of passageways 138 and 139 that strictly control the position of the legs 58 and 59 so that they cannot move with respect to one another. FIG. 22B illustrates the processed tube T partially inserted into the gate structure 118 with the distal end of the legs 58 and 59 of the processed tubes T beginning to enter the holes 141 provided in the stacked array of sheet metal fins 113. FIG. 22C illustrates the gate structure 118 in a shifted position thereof corresponding to the position illustrated in FIGS. 21A and 21C. The movable component 123 of the gate mechanism 118 has been shifted laterally so as to orient the tongues 128 laterally offset from the slots 124 in the component 121 and to bring the vertically upright part 142 of the C-shaped slot 127 into alignment with the aforementioned slots 124 in the component 121 and with the slots 133 in the component 122. The tongues 128, as shown in FIG. 21, slide laterally in the slot 132 in the component 122 and in the slot 119 in the wall 117. As a result, and as depicted in FIGS. 22C and 22D, the transfer rods 111 can urge the 180° bend 61 of each of the processed tubes T through the gate mechanism 118. A conventional servomotor M (FIG. 18) can be utilized for effecting a shifting of the movable component 123 relative to the stationary components 121 and 122 of the gate mechanism 118. In this particular embodiment, the servomotor M is of a reciprocal variety capable of moving the movable component 123 back and forth in direction of the arrow 143 illustrated in FIG. 18.

Although particular preferred embodiments of the invention have been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. A tube transfer device, comprising:

tube conveyor means for transporting processed tubes which are each U-shaped and include a pair of parallel legs interconnected at a common end by a 180° bend segment from an entry location to an exit location thereon, said tube conveyor means including a plurality of first tube holders holding means thereon for holding said processed tubes so that axes of said legs thereof will be oriented one above the other and extend parallel to one another and each of said processed tubes will be laterally spaced apart a distance from one another at said exit location;

support means for supporting a stacked array of thin sheet metal fins, each having plural holes extending therethrough and which are supported by said support means so that sets of holes are axially aligned along axes which extend parallel to said axes of said legs of said processed tubes;

means for orienting selected ones of said first tube holding means on said tube conveyor means so that said axes of each of said legs of said processed tubes thereon are axially aligned with a respective one of the aligned set of holes in said thin sheet metal fins;

first drive means for driving at least one processed tube, whose legs are oriented in axial alignment with a selected pair of holes in said stacked array of thin sheet metal fins, first into said selected pair of holes in said stacked array of thin sheet metal fins;

tube guide means for guiding and thereby facilitating an entry of said legs into said selected pair of holes, said tube guide means including first guide means supported for movement between first and second positions and oriented between said legs, when in said first position, and engage so as to limit for limiting an extent said legs can be flexed toward one another, said tube guide means also including second guide means adapted to engage said legs for limiting an extent that said legs can be flexed in directions other than toward one another; and second drive means for driving said first guide means from said first position to said second position to orient said first guide means laterally offset from said first position thereof and for facilitating movement of said 180° bend segment unobstructed by said first guide means past said tube guide means and toward a first one of said stack of thin sheet metal fins to complete a transfer of said at least one processed tube from said tube conveyor means to a laced relation with said stacked array of thin sheet metal fins.

2. The tube transfer device according to claim 1 wherein said first drive means includes at least one tube transfer bar and means for reciprocably moving said tube transfer bar into contact with said 180° bend segment of said at least one processed tube so as to drive said at least one processed tube into said selected pair of holes in said stacked array of thin sheet metal fins.

3. A tube transfer device, comprising:

tube conveyor means for transporting Processed tubes which are each U-shaped and include a pair of parallel legs interconnected at a common end by a 180° bend segment from an entry location to an exit location thereon, said tube conveyor means including a plurality of first tube holders thereon and which are adapted to hold said processed tubes so that axes of said legs thereof will be oriented one above the other and extend parallel to one another and each of said processed tubes will be laterally spaced apart a distance from one another at said exit location;

support means for supporting a stacked array of thin sheet metal fins, each having plural holes extending therethrough and which are supported by said support means so that sets of holes are axially aligned along axes which extend parallel to said axes of said legs of said processed tubes;

means orienting selected ones of said first tube holders on said tube conveyor means so that said axes of each of said legs of said processed tubes thereon are axially aligned with a respective one of the aligned set of holes in said thin sheet metal fins;

first drive means for driving at least one processed tube, whose legs are oriented in axial alignment with a selected pair of holes in said stacked array of thin sheet metal fins, first into said selected pair of holes in said stacked array of thin sheet metal fins;

guide means for guiding and thereby facilitating an entry of said legs into said selected Pair of holes, said guide means including first guide structure supported for movement between first and second positions and oriented between said legs, when in said first position, and adapted to engage said legs so as to limit an extent said legs can be flexed toward one another, said guide means also including second guide structure adapted to engage said legs so as to limit an extent that said legs can be flexed in directions other than toward one another, said second guide structure including a first and a second component fixedly secured facing one another, said first component having slots therein for receiving said at least one processed tube, said slots of said first component limiting the extent that said legs can be flexed in directions other than toward one another, said second component having a laterally extending slot with recesses therein for receiving said at least one processed tube, said recesses of said second component limiting the extent that said legs of said at least one processed tube can be flexed in directions other than toward one another, said first and second components each having a trough on sides thereof facing one another, said first guide structure including a movable component within said troughs of said first and second components; and second drive means for driving said first guide structure from said first position to said second position to orient said first guide structure laterally offset from said first position thereof so as to facilitate movement of said 180° bend segment unobstructed by said first guide structure past said guide means and toward a first one of said stack of thin sheet metal fins to complete a transfer of said at least one processed tube from said tube conveyor means to a laced relation with said stacked array of thin sheet metal fins.

4. The tube transfer device according to claim 3, wherein a plurality of processed tubes are driven by a corresponding number of a plurality of tube transfer bars of said first drive means into holes in said stacked array of thin sheet metal fins, wherein said moveable component includes a plurality of C-shaped slots having legs and a plurality of outwardly projecting tongues, each of said plurality of tongues extending outwardly from said movable component at a region between said legs of each one of said C-shaped slots, said legs of said C-shaped slot being axially aligned with said slots of said first component when said moveable component is in said first position of said first guide structure so that said legs of each of said processed tubes will straddle a respective one of said tongues to limit the extent said legs of each of said processed tubes can be flexed toward one another, said plurality of tongues extending through said laterally extending slot in said second component so that said plurality of tongues are moveable into said first and second positions of said first guide structure.

5. The tube transfer device according to claim 4, wherein said support means includes a trough supporting said stacked array of thin sheet metal fins, wherein said second component has a plurality of further tongues extending from a side opposite said side facing said first component, said second guide structure including an end wall of said trough, said end wall having a laterally extending slot therein for receiving said plurality of tongues of said moveable component, said laterally extending slot of said end wall having recesses and receptacles therein, said recesses each receiving a respective one of said plurality of processed tubes so as to limit the extent that said legs of each of said plurality of processed tubes can be flexed in directions other than toward each other, and said receptacles each receiving a respective one of said plurality of said further tongues of said second component so as to align said recesses of said end wall with said recesses of said second component.

* * * * *

UNITED STATES PATENT AND TRADEMARK OFFICE
CERTIFICATE OF CORRECTION

PATENT NO. : 5,752,312
DATED : May 19, 1998
INVENTOR(S) : Galen B. HARMAN et al

It is certified that error appears in the above-indentified patent and that said Letters Patent is hereby corrected as shown below:

Column 10, line 60; delete "holders".

Column 11, lines 19-20; delete "and engage so as to limit".

Column 12, line 8; change "position." to ---position,---.

Signed and Sealed this

Twenty-seventh Day of October, 1998

Attest:

BRUCE LEHMAN

Attesting Officer     Commissioner of Patents and Trademarks